US012718561B2

(12) United States Patent
Qin et al.

(10) Patent No.: US 12,718,561 B2
(45) Date of Patent: Aug. 25, 2026

(54) PROTECTION OF PERSONALLY IDENTIFIABLE CONTENT IN A VIDEO STREAM GENERATED BY AN IMAGING DEVICE DURING A MEDICAL PROCEDURE

(71) Applicant: Intuitive Surgical Operations, Inc., Sunnyvale, CA (US)

(72) Inventors: Yidan Qin, Chicago, IL (US); Maximilian H. Allan, Mill Valley, CA (US); Mahdi Azizian, San Jose, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 41 days.

(21) Appl. No.: 18/568,564

(22) PCT Filed: Jun. 24, 2022

(86) PCT No.: PCT/US2022/073159
§ 371 (c)(1),
(2) Date: Dec. 8, 2023

(87) PCT Pub. No.: WO2023/278965
PCT Pub. Date: Jan. 5, 2023

(65) Prior Publication Data

US 2024/0273900 A1 Aug. 15, 2024

Related U.S. Application Data

(60) Provisional application No. 63/215,870, filed on Jun. 28, 2021.

(51) Int. Cl.
*G06V 20/40* (2022.01)
*G06F 21/62* (2013.01)
(Continued)

(52) U.S. Cl.
CPC .......... *G06V 20/41* (2022.01); *G06F 21/6263* (2013.01); *G06V 10/764* (2022.01);
(Continued)

(58) Field of Classification Search
CPC ........ G06V 20/41; G06V 20/50; G06V 10/96; G06V 10/764; G06V 40/10; G06V 2201/03; G06F 21/6263
(Continued)

(56) References Cited

U.S. PATENT DOCUMENTS 10,917,571 B2 * 2/2021 Shanmugam .......... H04N 23/62
11,610,461 B2 * 3/2023 Lundberg ................. H04N 7/18
(Continued)

FOREIGN PATENT DOCUMENTS

CN 116091963 A * 5/2023 ............. G06V 20/40
CN 118737419 A * 10/2024 ......... A61B 1/00042
(Continued)

OTHER PUBLICATIONS

International Preliminary Report on Patentability for Application No. PCT/US2022/073159, mailed Jan. 11, 2024, 11 pages.
(Continued)

*Primary Examiner* — Tauqir Hussain
(74) *Attorney, Agent, or Firm* — ALG Intellectual Property, LLC

(57) ABSTRACT

An illustrative image processing system is configured to apply a video stream to a machine learning model, the video stream generated by an imaging device during a medical procedure performed with respect to a patient; classify, based on an output of the machine learning model, an image frame included in the video stream as an ex-body frame that depicts content external to a body of the patient: and apply, based on the classifying the image frame as the ex-body frame, a privacy enhancing operation to the image frame.

18 Claims, 14 Drawing Sheets

(51) Int. Cl.

| | |
|---|---|
| ***G06V 10/764*** | (2022.01) |
| ***G06V 10/96*** | (2022.01) |
| ***G06V 20/50*** | (2022.01) |
| ***G06V 40/10*** | (2022.01) |

(52) U.S. Cl.

CPC .............. *G06V 10/96* (2022.01); *G06V 20/50* (2022.01); *G06V 40/10* (2022.01); *G06V 2201/03* (2022.01)

(58) Field of Classification Search

USPC ............................................................ 726/28

See application file for complete search history.

(56) References Cited

U.S. PATENT DOCUMENTS

| | | | | |
|---|---|---|---|---|
| 2009/0125337 | A1* | 5/2009 | Abri | G16H 40/20 705/3 |
| 2011/0026840 | A1* | 2/2011 | Tao | G06V 20/35 382/224 |
| 2013/0218137 | A1* | 8/2013 | Abovitz | A61B 34/70 606/1 |
| 2016/0149794 | A1* | 5/2016 | Coles | H04L 45/02 370/389 |
| 2019/0028630 | A1* | 1/2019 | Zeng | H04N 23/67 |
| 2019/0340731 | A1* | 11/2019 | Nyström | G06T 5/20 |
| 2020/0065975 | A1* | 2/2020 | Sharma | G06V 10/454 |
| 2021/0012032 | A1* | 1/2021 | Bishop | G16H 30/20 |
| 2021/0166356 | A1* | 6/2021 | Ameisen | G06T 7/0002 |
| 2023/0050833 | A1* | 2/2023 | Cherubini | G06T 7/0012 |
| 2023/0316756 | A1* | 10/2023 | Wang | G06V 20/35 382/128 |
| 2023/0410491 | A1* | 12/2023 | Mohareri | G06V 10/764 |
| 2024/0242505 | A1* | 7/2024 | Yarlagadda | G06V 10/12 |

FOREIGN PATENT DOCUMENTS

| | | | | |
|---|---|---|---|---|
| WO | WO-2020014198 | A1 | 1/2020 | |
| WO | WO-2020122962 | A1 | 6/2020 | |
| WO | WO-2020236191 | A1 | 11/2020 | |
| WO | WO-2022109176 | A1 | 5/2022 | |
| WO | WO-2024102489 | A1 * | 5/2024 | G16H 20/00 |

OTHER PUBLICATIONS

International Search Report and Written Opinion (Corrected Version) for Application No. PCT/US2022/073159, mailed Oct. 27, 2022, 14 pages.

Vertut, J., and Coiffet, P., “Robot Technology: Teleoperation and Robotics Evolution and Development,” English translation, Prentice-Hall, Inc., Inglewood Cliffs, NJ, USA 1986, vol. 3A, 332 pages.

Sestini, L., et al., “A Kinematic Bottleneck Approach for Pose Regression of Flexible Surgical Instruments Directly from Images,” IEEE Robotics and Automation Letters, vol. 6(2), Feb. 25, 2021, pp. 2938-2945, XP011844885.

* cited by examiner 1000
1004-1
1004-2
1002-2
1002-1

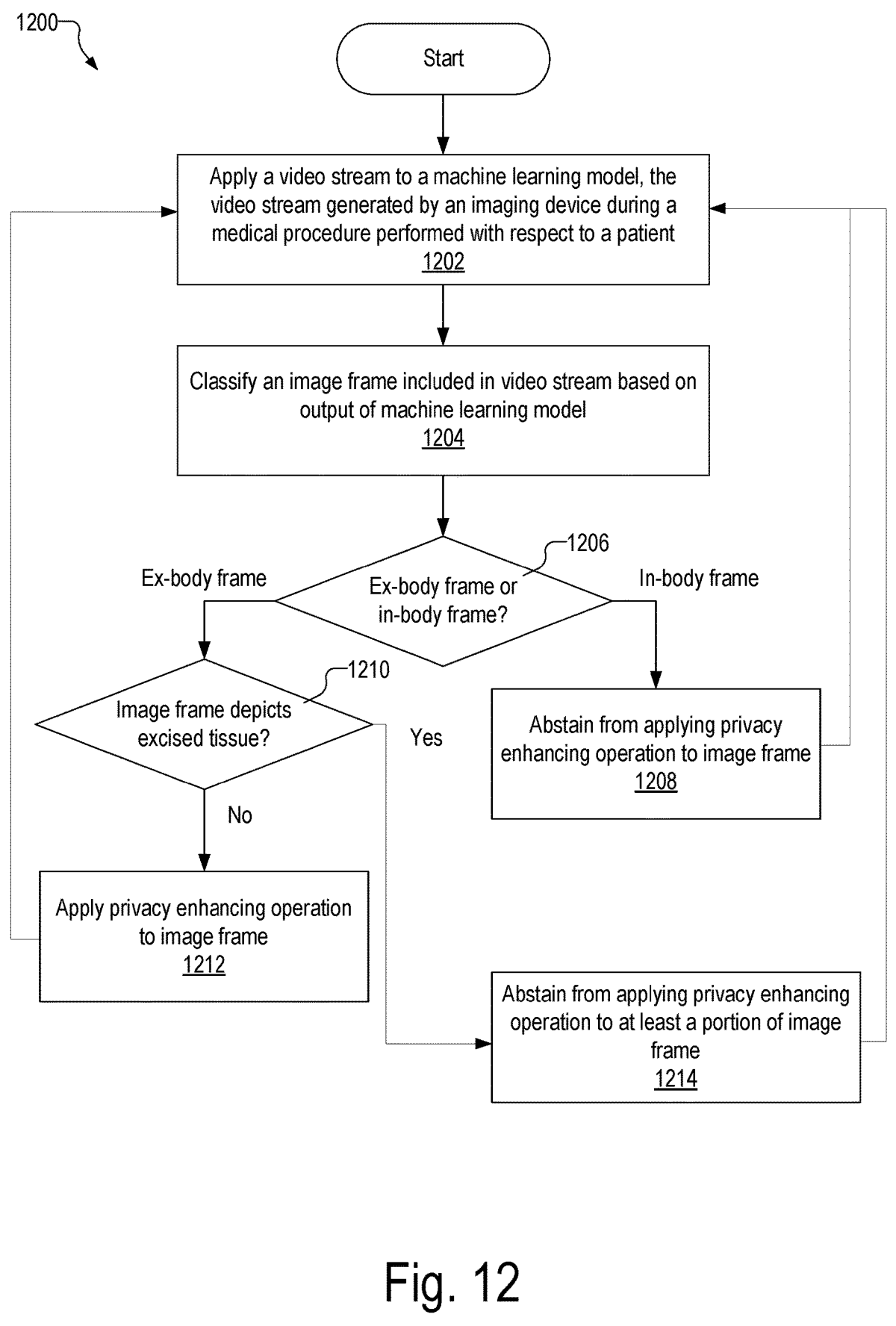

1200

Start

Apply a video stream to a machine learning model, the video stream generated by an imaging device during a medical procedure performed with respect to a patient
1202

Classify an image frame included in video stream based on output of machine learning model
1204

1206

Ex-body frame or in-body frame?

Ex-body frame

In-body frame

1210

Image frame depicts excised tissue?

Yes

No

Abstain from applying privacy enhancing operation to image frame
1208

Apply privacy enhancing operation to image frame
1212

Abstain from applying privacy enhancing operation to at least a portion of image frame
1214

Fig. 12

PROTECTION OF PERSONALLY IDENTIFIABLE CONTENT IN A VIDEO STREAM GENERATED BY AN IMAGING DEVICE DURING A MEDICAL PROCEDURE

RELATED APPLICATIONS

The present application is a U.S. National Stage Application under 35 U.S.C. § 371 of International Application No. PCT/US2022/073159, filed on Jun. 24, 2022, which claims priority to U.S. Provisional Patent Application No. 63/215,870, filed Jun. 28, 2021, each of which is hereby incorporated by reference in its entirety.

BACKGROUND INFORMATION

It is often desirable to save and/or share images acquired by an endoscope or other type of imaging device during a medical procedure. For example, it may be desirable to save the images for training and/or analysis purposes, stream the images to remote observers during and/or after the medical procedure, etc.

During the course of a medical procedure, the endoscope may acquire one or more images that depict personally identifiable content, such as the face of the patient and/or one or more operating room staff members, identifying features (e.g., tattoos and/or moles), and/or text (e.g., the patient's name and/or date of birth, operating room staff badges, etc.). Images of such personally identifiable content may be acquired, for example, as the endoscope is being inserted into and/or removed from a body of the patient.

To comply with various privacy policies (e.g., the Health Insurance Portability and Accountability Act (HIPPA)), care must be taken to remove personally identifiable content from images acquired by an endoscope before the images are saved and/or shared with others. Heretofore, this has required human intervention in the form of manual review and editing, which is time consuming and costly.

SUMMARY

The following description presents a simplified summary of one or more aspects of the systems and methods described herein. This summary is not an extensive overview of all contemplated aspects and is intended to neither identify key or critical elements of all aspects nor delineate the scope of any or all aspects. Its sole purpose is to present one or more aspects of the systems and methods described herein as a prelude to the detailed description that is presented below.

An illustrative system comprises a memory storing instructions; and a processor communicatively coupled to the memory and configured to execute the instructions to: apply a video stream to a machine learning model, the video stream generated by an imaging device during a medical procedure performed with respect to a patient; classify, based on an output of the machine learning model, an image frame included in the video stream as an ex-body frame that depicts content external to a body of the patient; and apply, based on the classifying the image frame as the ex-body frame, a privacy enhancing operation to the image frame.

Another illustrative system comprises a memory storing instructions; and a processor communicatively coupled to the memory and configured to execute the instructions to: apply a video stream to a machine learning model, the video stream generated by an imaging device during a medical procedure performed with respect to a patient; determine, based on an output of the machine learning model, a content classification of an image frame included in the video stream, the content classification indicating whether the image frame is an ex-body frame that depicts content external to a body of the patient or an in-body frame that does not depict content external to the body of the patient; and perform, based on the content classification, an operation with respect to the image frame.

Another illustrative system comprises a memory storing instructions; and a processor communicatively coupled to the memory and configured to execute the instructions to: apply a video stream to a machine learning model, the video stream generated by an imaging device during a medical procedure performed with respect to a patient; determine, based on an output of the machine learning model, a content classification of an image frame included in the video stream, the content classification indicating whether the image frame is an ex-body frame that depicts content external to a body of the patient or an in-body frame that does not depict content external to the body of the patient; and perform, based on the content classification, an operation with respect to the image frame.

Another illustrative system comprises an imaging device configured to generate a video stream during a medical procedure performed with respect to a patient; and an image processing system configured to: receive the video stream from the imaging device; apply the video stream to a machine learning model; determine, based on an output of the machine learning model, a content classification of an image frame included in the video stream, the content classification indicating whether the image frame is an ex-body frame that depicts content external to a body of the patient or an in-body frame that does not depict content external to the body of the patient; and perform, based on the content classification, an operation with respect to the image frame.

An illustrative method comprises applying, by an image processing system, a video stream to a machine learning model, the video stream generated by an imaging device during a medical procedure performed with respect to a patient; classifying, by the image processing system based on an output of the machine learning model, an image frame included in the video stream as an ex-body frame that depicts content external to a body of the patient; and applying, by the image processing system based on the classifying the image frame as the ex-body frame, a privacy enhancing operation to the image frame.

Another illustrative method comprises applying, by an image processing system, a video stream to a machine learning model, the video stream generated by an imaging device during a medical procedure performed with respect to a patient; classifying, by the image processing system based on an output of the machine learning model, a first plurality of image frames included in the video stream as in-body frames that depict content internal to the body of the patient; and applying, by the image processing system based on the classifying the first plurality of image frames as in-body frames, a privacy enhancing operation to a second plurality of image frames included in the video stream, the second plurality of image frames not included in the first plurality of image frames.

Another illustrative method comprises applying, by an image processing system, a video stream to a machine learning model, the video stream generated by an imaging device during a medical procedure performed with respect to a patient; determining, by the image processing system based on an output of the machine learning model, a content classification of an image frame included in the video stream, the content classification indicating whether the image frame is an ex-body frame that depicts content external to a body of the patient or an in-body frame that does not depict content external to the body of the patient; and performing, by the image processing system based on the content classification, an operation with respect to the image frame.

An illustrative non-transitory computer-readable medium stores instructions that, when executed, direct a processor of a computing device to: apply a video stream to a machine learning model, the video stream generated by an imaging device during a medical procedure performed with respect to a patient; classify, based on an output of the machine learning model, an image frame included in the video stream as an ex-body frame that depicts content external to a body of the patient; and apply, based on the classifying the image frame as the ex-body frame, a privacy enhancing operation to the image frame.

Another illustrative non-transitory computer-readable medium stores instructions that, when executed, direct a processor of a computing device to: apply a video stream to a machine learning model, the video stream generated by an imaging device during a medical procedure performed with respect to a patient; determine, based on an output of the machine learning model, a content classification of an image frame included in the video stream, the content classification indicating whether the image frame is an ex-body frame that depicts content external to a body of the patient or an in-body frame that does not depict content external to the body of the patient; and perform, based on the content classification, an operation with respect to the image frame.

Another illustrative non-transitory computer-readable medium stores instructions that, when executed, direct a processor of a computing device to: apply a video stream to a machine learning model, the video stream generated by an imaging device during a medical procedure performed with respect to a patient; determine, based on an output of the machine learning model, a content classification of an image frame included in the video stream, the content classification indicating whether the image frame is an ex-body frame that depicts content external to a body of the patient or an in-body frame that does not depict content external to the body of the patient; and perform, based on the content classification, an operation with respect to the image frame.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 12 shows an illustrative method.

DETAILED DESCRIPTION

An illustrative image processing system is configured to access a video stream generated by an imaging device during a medical procedure performed with respect to a patient and apply the video stream to a machine learning model. Based on an output of the machine learning model, the image processing system may determine a content classification of an image frame included in the video stream. As described herein, the content classification may indicate whether the image frame is an ex-body frame that depicts content external to a body of the patient or an in-body frame that does not depict content external to the body of the patient. Based on the content classification, the image processing system may perform an operation with respect to the image frame.

For example, if the content classification indicates that the image frame is the ex-body frame that depicts content external to the body of the patient, the image processing system may apply a privacy enhancing operation to the image frame. Illustrative privacy enhancing operations including removing the image frame from the video stream, blurring the image frame such that personally identifiable content depicted in the image frame is not discernable when seen by a user, and/or otherwise ensuring that the personally identifiable content is not discernable. Alternatively, if the content classification indicates that the image frame is the in-body frame that does not include content external to the body of the patient, the image processing system may abstain from applying a privacy enhancing operation to the image frame.

The systems and methods described herein may facilitate accurate and efficient protection of personally identifiable content in a video stream generated by an imaging device during a medical procedure. In this manner, the need for manual review and editing of the video stream may be minimized or eliminated. Moreover, the systems and methods described herein may facilitate substantially real-time sharing of a video stream acquired by an imaging device during a medical procedure. For example, the video stream may be streamed to an observer located remote from an operating room in which the medical procedure is taking place in substantially real-time as the medical procedure is taking place. These and other benefits and advantages of the present systems and methods are described herein.

Figure 1:
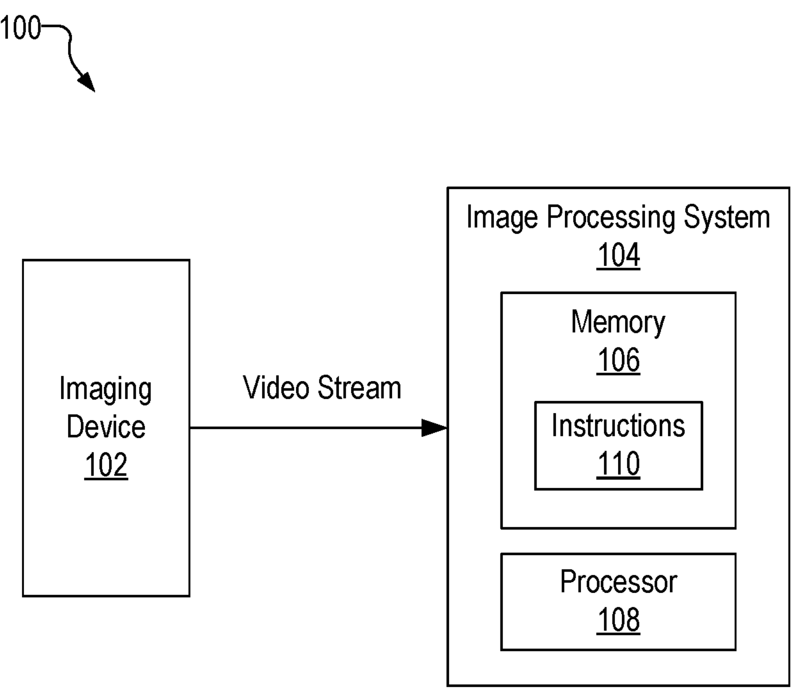
FIG. 1 shows an illustrative medical imaging system.

FIG. 1 shows an illustrative medical imaging system 100 configured to generate images of a scene during a medical procedure. In some examples, the scene may include a surgical area associated with a body on or within which the medical procedure is being performed (e.g., a body of a live animal, a human or animal cadaver, a portion of human or animal anatomy, tissue removed from human or animal anatomies, non-tissue work pieces, training models, etc.).

As shown, medical imaging system 100 includes an imaging device 102 in communication with an image processing system 104. Medical imaging system 100 may include additional or alternative components as may serve a particular implementation. In some examples, medical imaging system 100 or certain components of medical imaging system 100 may be implemented by a computer-assisted medical system.

Imaging device 102 may be implemented by an endoscope or other suitable device configured to generate one or more video streams. As used herein, a video stream may include a sequence of image frames (also referred to herein as images) of a scene captured by imaging device 102. The image frames may include one or more visible light image frames (i.e., one or more images acquired using visible light illumination) and/or one or more alternate imaging modality frames (e.g., one or more images acquired using non-visible light). Illustrative alternate imaging modality frames include fluorescence images acquired using fluorescence excitation illumination having wavelengths in a near-infrared light region.

Image processing system 104 may be configured to access (e.g., receive) a video stream generated by imaging device 102 and perform various operations with respect to the video stream, as described herein.

Image processing system 104 may be implemented by one or more computing devices and/or computer resources (e.g., processors, memory devices, storage devices, etc.) as may serve a particular implementation. As shown, image processing system 104 may include, without limitation, a memory 106 and a processor 108 selectively and communicatively coupled to one another. Memory 106 and processor 108 may each include or be implemented by computer hardware that is configured to store and/or process computer software. Various other components of computer hardware and/or software not explicitly shown in FIG. 1 may also be included within image processing system 104. In some examples, memory 106 and processor 108 may be distributed between multiple devices and/or multiple locations as may serve a particular implementation.

Memory 106 may store and/or otherwise maintain executable data used by processor 108 to perform any of the functionality described herein. For example, memory 106 may store instructions 110 that may be executed by processor 108. Memory 106 may be implemented by one or more memory or storage devices, including any memory or storage devices described herein, that are configured to store data in a transitory or non-transitory manner. Instructions 110 may be executed by processor 108 to cause image processing system 104 to perform any of the functionality described herein. Instructions 110 may be implemented by any suitable application, software, code, and/or other executable data instance. Additionally, memory 106 may also maintain any other data accessed, managed, used, and/or transmitted by processor 108 in a particular implementation.

Processor 108 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), image signal processors, or the like. Using processor 108 (e.g., when processor 108 is directed to perform operations represented by instructions 110 stored in memory 106), image processing system 104 may perform various operations as described herein.

Various implementations of image processing system 104 will now be described with reference to the figures. The various modules illustrated in these figures as being included in image processing system 104 may be implemented by any suitable combination of hardware and/or software. As such, the modules represent various functions that may be performed by image processing system 104 alone or in combination with any of the other functions described herein as being performed by image processing system 104 and/or a component thereof.

Figure 2:
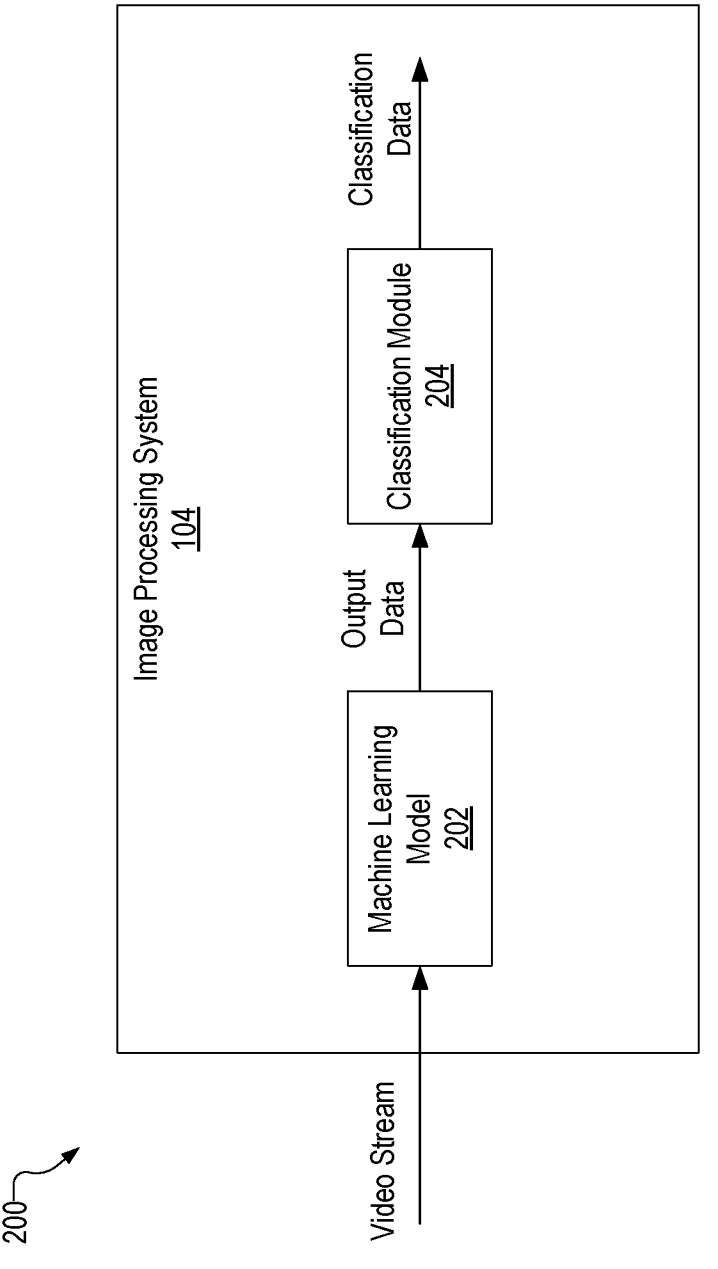
FIGS. 2-6 show illustrative implementations of the image processing system of FIG. 1.

FIG. 2 shows an illustrative implementation 200 of image processing system 104. As shown, image processing system 104 may be configured to apply a video stream (e.g., a video stream generated by imaging device 102) to a machine learning model 202. A classification module 204 may be configured to determine, based on output data generated by machine learning model 202 (also referred to herein simply as an output of machine learning model 202), a content classification of image frames included in the video stream.

Machine learning model 202 may be configured to perform any suitable machine learning heuristic (also referred to as artificial intelligence heuristic) with respect to a video stream that is provided as an input to machine learning model 202. Machine learning model 202 may accordingly be supervised and/or unsupervised as may serve a particular implementation and may be configured to implement one or more decision tree learning algorithms, association rule learning algorithms, artificial neural network learning algorithms, deep learning algorithms, bitmap algorithms, and/or any other suitable data analysis technique as may serve a particular implementation.

In some examples, machine learning model 202 is implemented by one or more neural networks, such as one or more deep convolutional neural networks (CNN) (e.g., a MobileNet V2 model) using internal memories of its respective kernels (filters), recurrent neural networks (RNN), and/or long/short term memory neural networks (LSTM). Machine learning model 202 may be multi-layer. For example, machine learning model 202 may be implemented by a neural network that includes an input layer, one or more hidden layers, and an output layer.

Machine learning model 202 may be trained to differentiate between image frames included within the video stream that depict ex-body content (i.e., content located outside a patient) and image frames that do not depict ex-body content. In some examples, image frames that do not depict ex-body content may depict in-body content (i.e., content located inside a patient). Such training may be performed in any suitable manner. For example, images already annotated (e.g., with metadata) as depicting ex-body content and images already annotated (e.g., with metadata) as depicting in-body content may be provided as training inputs to machine learning model 202.

In some examples, the output of machine learning model 202 is a probability that a particular image frame is an in-body frame. As described herein, classification module 204 may compare the probability to a threshold to determine whether to classify the image frame as an in-body frame or an ex-body frame.

Machine learning model 202 may be maintained by image processing system 104, as illustrated in FIG. 2. In some alternative embodiments, machine learning model 202 may be maintained by a system remote from image processing system 104. In these alternative embodiments, image processing system 104 may transmit the video stream (e.g., by way of a network) to the remote system for processing by machine learning model 202.

As mentioned, classification module 204 may be configured to determine, based on the output of machine learning model 202, a content classification of image frames included in the video stream. The content classification may indicate whether a particular image frame is an ex-body frame that depicts content external to a body of the patient or an in-body frame that does not depict content external to the body of the patient.

Classification module 204 may determine a content classification for a particular image frame in any suitable manner. For example, as mentioned, the output of machine learning model 202 may be a probability that a particular image frame is an in-body frame. Classification module 204 may accordingly compare the probability output by machine learning model 202 to a threshold to determine the content classification of the image frame. For example, classification module 202 may classify the image frame as an ex-body frame if the probability is less than the threshold. Alternatively, classification module 202 may classify the image frame as the in-body frame if the probability is greater than threshold.

The threshold to which classification module 204 compares the probability output by machine learning module 202 may be set to be any suitable value. For example, the threshold may be set to be relatively high (e.g., 0.87 or higher) to minimize false positives (i.e., to minimize the number of image frames that are classified as in-body frames, even though they actually depict ex-body content).

In some examples, image processing system 104 may set the threshold based on one or more properties associated with the medical procedure. For example, a particular type of surgery may warrant a relatively high threshold or a relatively low threshold. Image processing system 104 may accordingly determine a property associated with the medical procedure and set the threshold based on the property.

In some examples, image processing system 104 may dynamically adjust the threshold based on one or more factors. For example, the threshold may be dynamically lowered during the medical procedure based on user feedback that too many image frames are being classified as ex-body frames.

The classification of an image frame may be based on one or more other factors.

Figure 3:
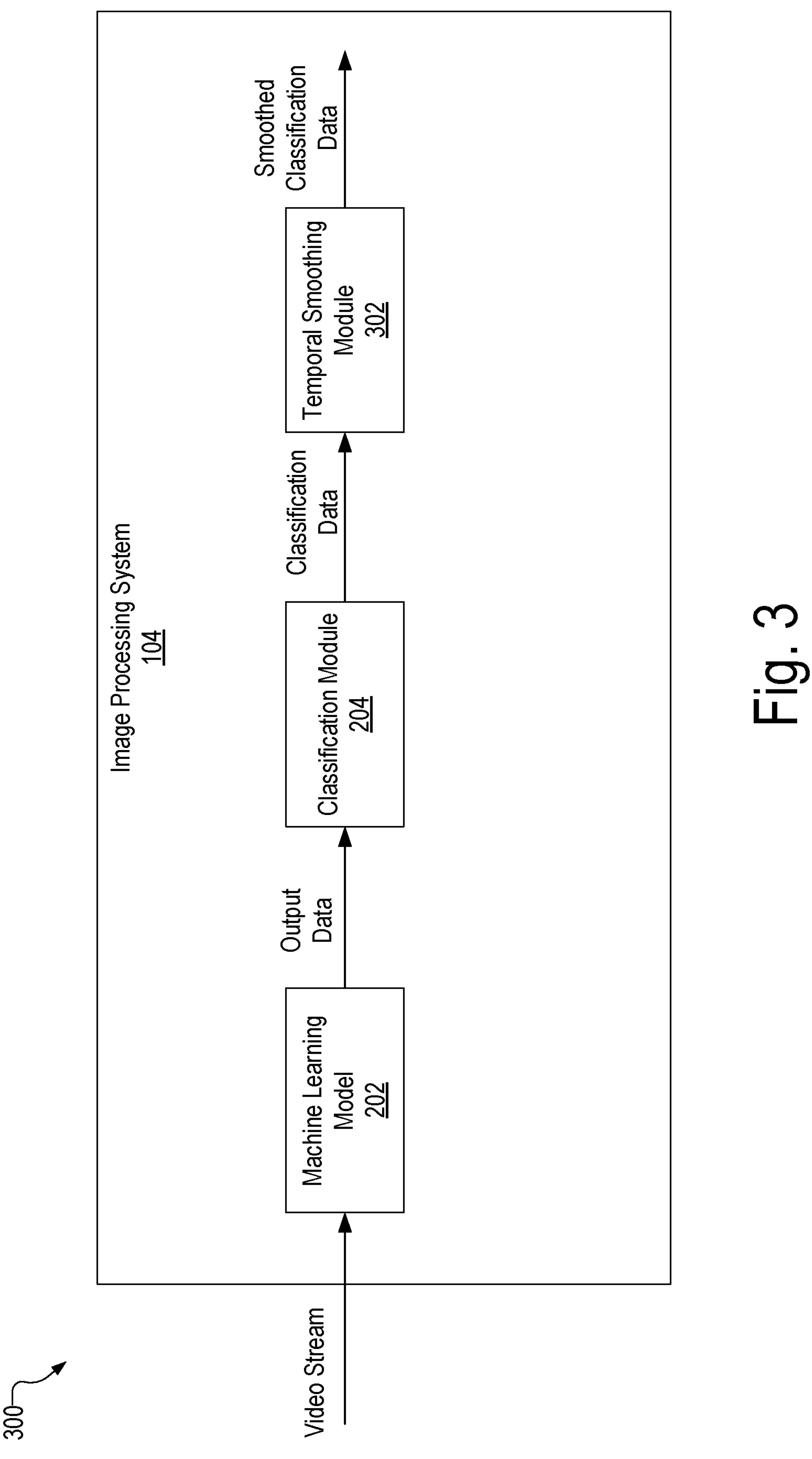

For example, FIG. 3 shows another illustrative implementation 300 of image processing system 104 in which a temporal smoothing module 302 is configured to apply a temporal smoothing filter to the content classification of the image frame and content classifications of one or more other image frames included in the video stream that are temporally adjacent to the image frame. As shown, temporal smoothing module 302 may output smoothed classification data, which may be indicative of an adjusted content classification of one or more image frames based on the application of the temporal smoothing filter.

For example, temporal smoothing module 302 may apply the temporal smoothing filter to a time series data stream of classifications for a sequence of image frames in the video stream. If, for example, five adjacent image frames are classified as in-body frame, in-body frame, ex-body frame, in-body frame, and in-body frame, respectively, the temporal smoothing filter may adjust the content classification of the third image frame from ex-body frame to in-body frame.

The temporal smoothing filter applied by temporal smoothing module 302 may be implemented by any suitable filter. For example, the temporal smoothing filter may be implemented by a median filter, with the filter width determined based on the video stream's frame rate to correspond to one second of video footage.

Additionally or alternatively, if imaging device 102 is attached to a manipulator arm of a computer-assisted medical system while the video stream is generated by imaging device 102, classification module 204 may be configured to further base a classification of an image frame on kinematics data associated with the computer-assisted medical system.

Figure 4:
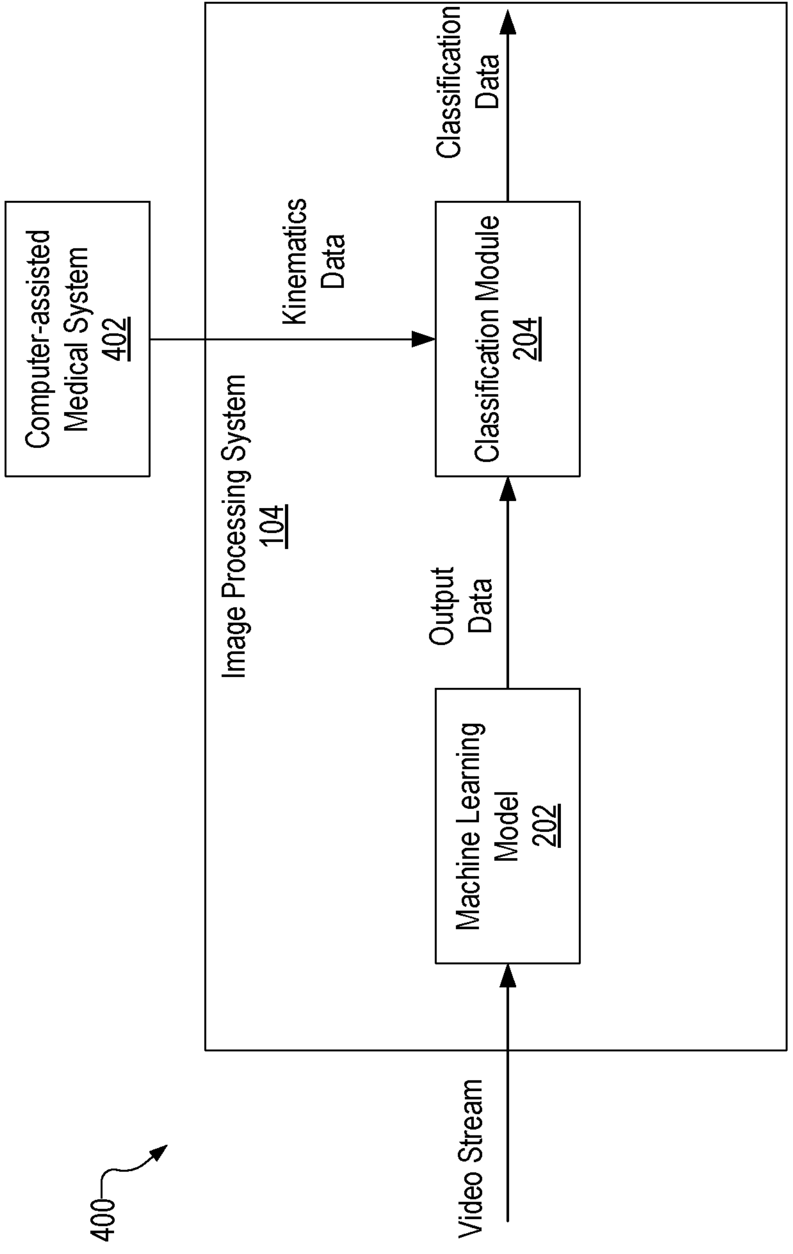

To illustrate, FIG. 4 shows another illustrative implementation 400 of image processing system 104 in which classification module 204 is further configured to access kinematics data associated with a computer-assisted medical system 402 and base a classification of an image frame on the kinematics data. Classification module 204 may access the kinematics data in any suitable manner. For example, classification module 204 may receive the kinematics data directly from computer-assisted medical system 402. An illustrative implementation of computer-assisted medical system 402 is described herein.

The kinematics data may indicate a relative position of imaging device 102 with respect to a body of a patient, movement of imaging device 102, and/or other types of motion data that may indicate whether imaging device 102 is within or outside the body. For example, the kinematics data may indicate that imaging device 102 is moving away from the body. Classification module 204 may take this into account in any suitable manner when performing the classification of an image frame acquired while imaging device 102 is moving away from the body.

In some examples, image processing system 104 may use the kinematics data and/or any other suitable data to identify a time interval during the medical procedure during which imaging device 102 moves less than a threshold amount, thereby indicating that imaging device 102 is stationary. Based on this, image processing system 104 may abstain from applying, to machine learning model 202, a video segment included in the video stream and that corresponds to the time interval. This may save processing resources during times that imaging device 102 is moving. In some examples, the time interval must exceed a threshold amount of time before image processing system 104 abstains from applying the video stream to machine learning model 202.

Additionally or alternatively, classification module 204 may be configured to further base a classification of an image frame on a particular phase of the medical procedure. For example, a medical procedure may be divided into a number of sequential phases that each correspond to one or more operations performed during the medical procedure. To illustrate, a first phase may correspond to a time period during which the imaging device 102 and/or a particular surgical instrument is being inserted into the patient, a second phase may correspond to a time period during which a particular surgical instrument (e.g., a cautery tool) is being used during the medical procedure, and a third phase may correspond to a time period during which the imaging device 102 and/or a particular surgical instrument is being removed from the patient. Each phase may be associated with a particular likelihood that an image frame acquired during that phase is an ex-body frame or an in-body frame.

Figure 5:
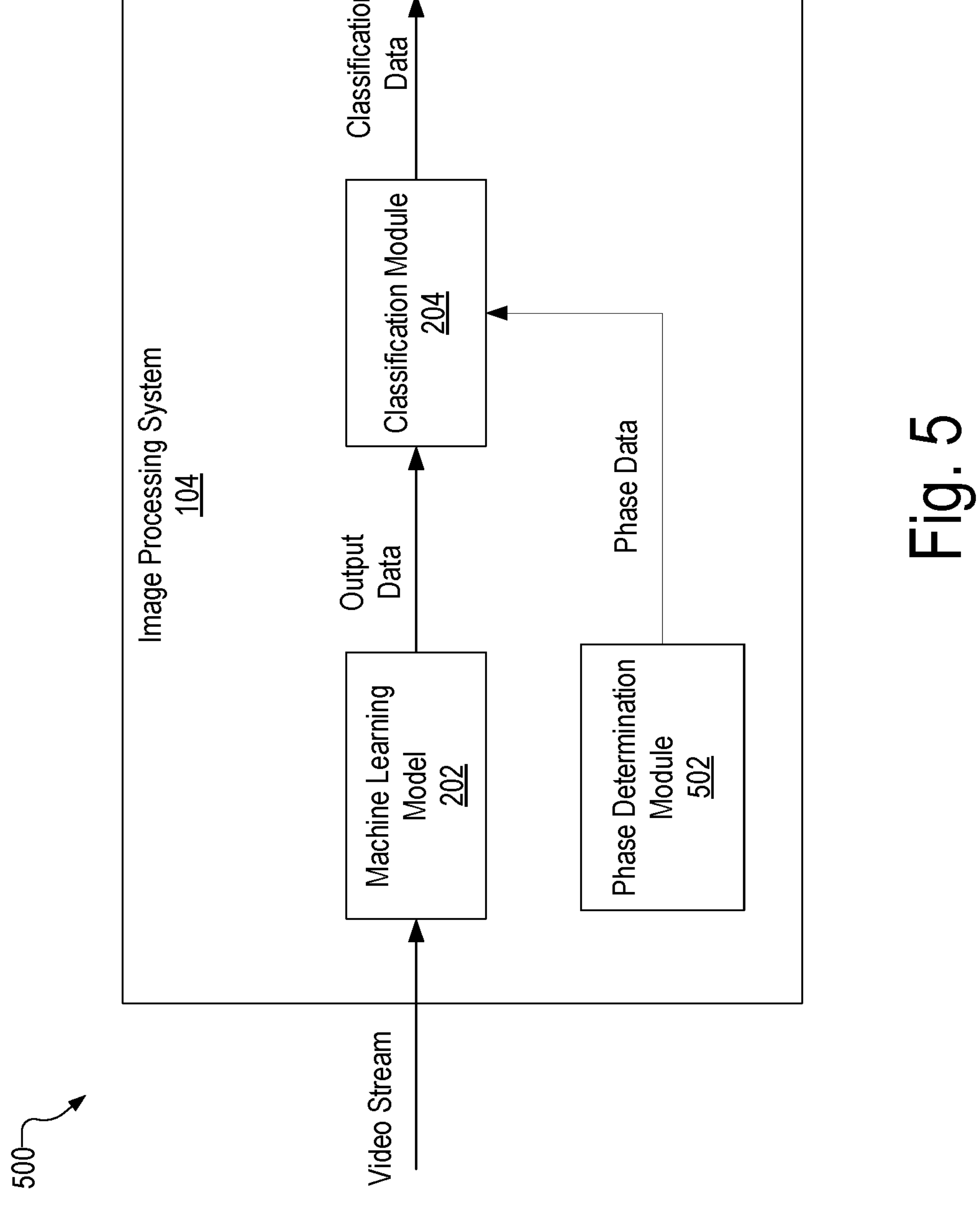

Accordingly, FIG. 5 shows an illustrative implementation 500 of image processing system 104 in which a phase determination module 502 is configured to output phase data representative of a current phase of a medical procedure that corresponds to when a particular image frame is acquired. As shown, classification module 204 is further configured to base a classification of the image frame on the phase data. Phase determination module 502 may determine the phase based on user input, kinematics data, image data, and/or in any other suitable manner.

Figure 6:
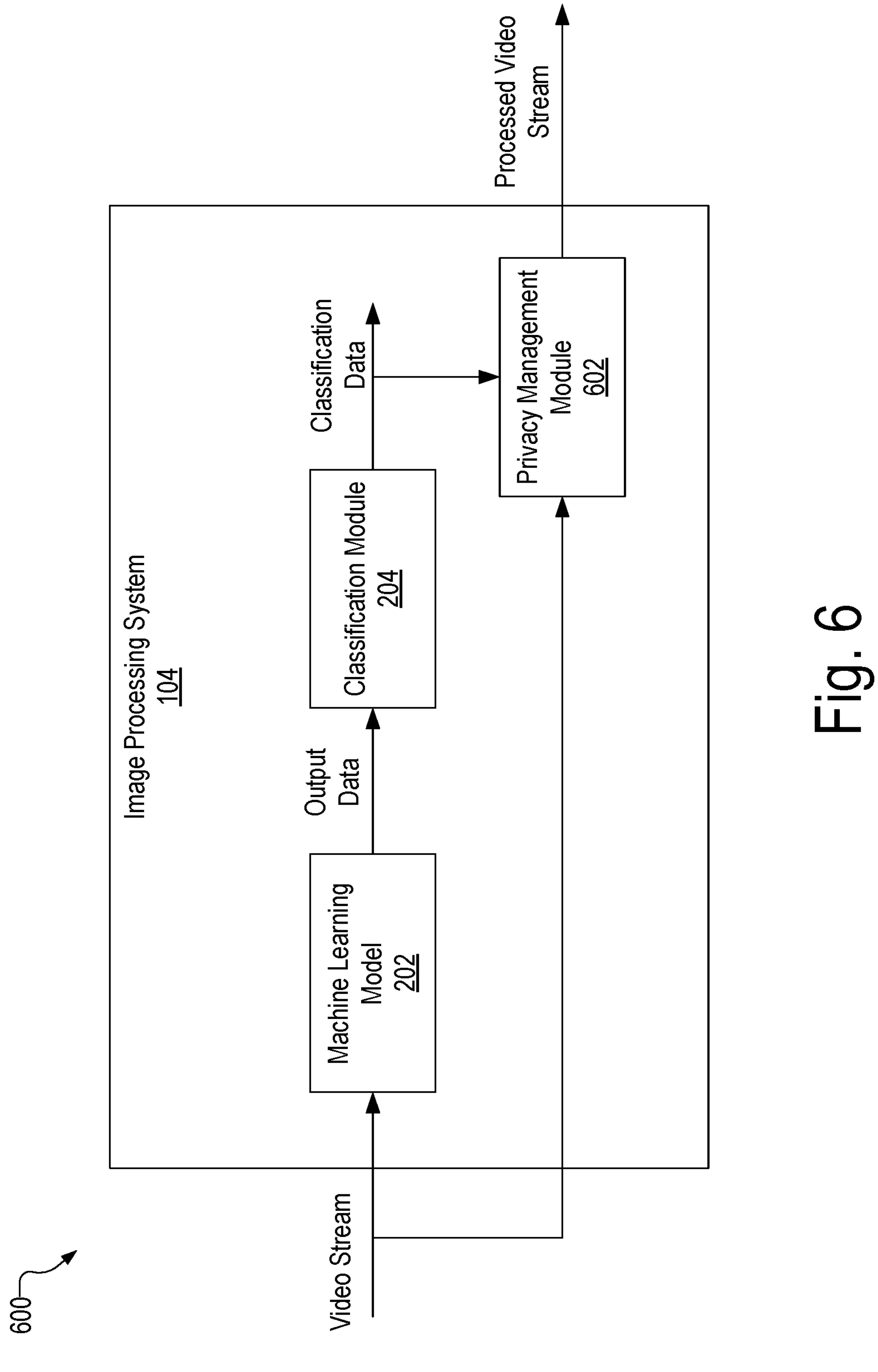

Image processing system 104 may perform one or more operations with respect to an image frame based on a content classification of the image frame. For example, FIG. 6 shows an illustrative implementation 600 of image processing system 104 in which a privacy management module 602 is configured process the video stream in accordance with the classification data and output a processed video stream. In particular, privacy management module 602 may perform one or more privacy-related operations with respect to an image frame included in the video stream depending on whether the image frame is classified as an ex-body frame or an in-body frame.

Figure 7:
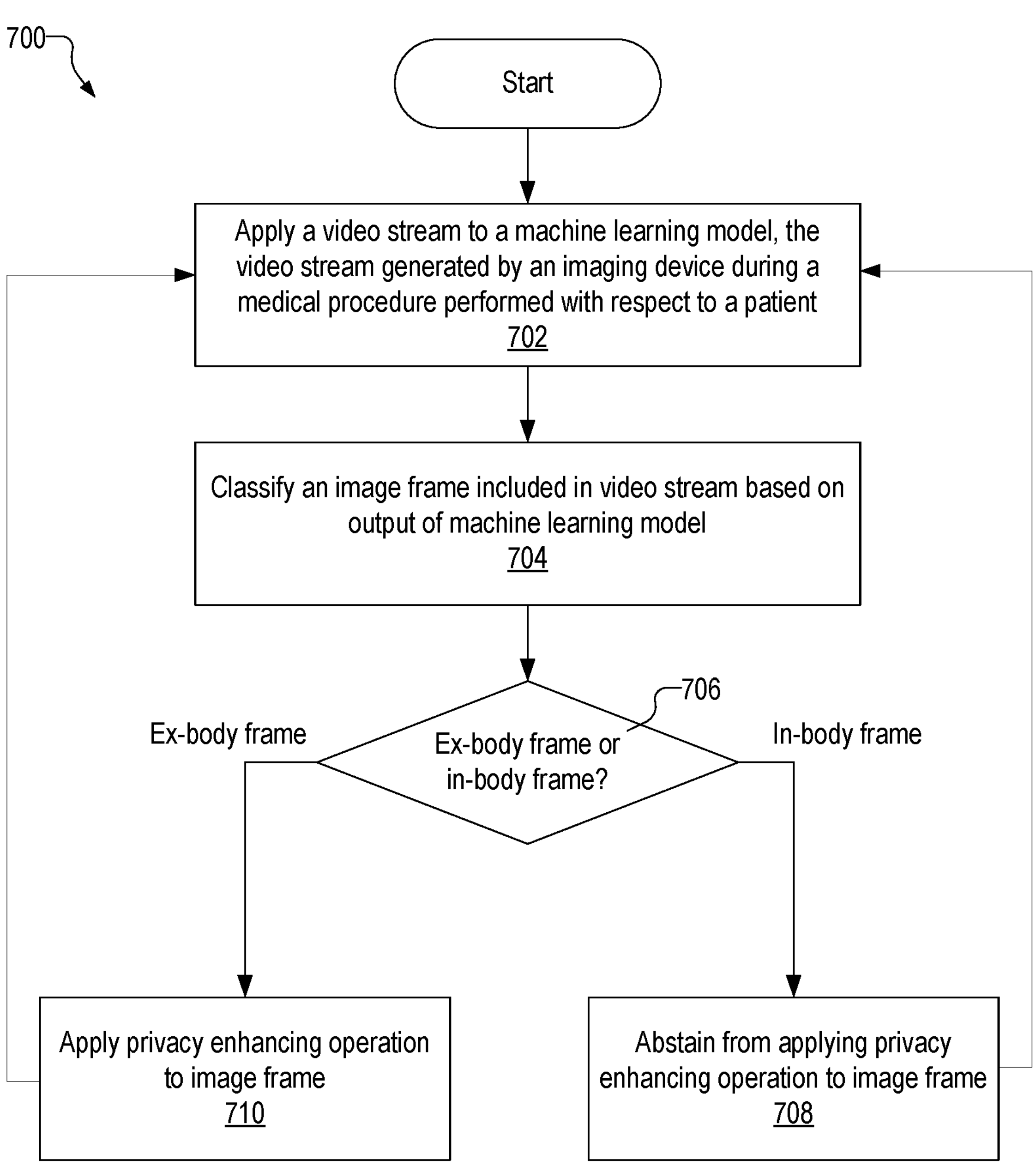
FIG. 7 shows an illustrative method.

To illustrate, FIG. 7 shows an illustrative method 700 that may be performed by image processing system 104 and/or any implementation thereof and that illustrates example privacy-related operations that may be performed by image processing system 104 (e.g., privacy management module 602) with respect to an image frame. While FIG. 7 depicts illustrative operations according to one embodiment, other embodiments may omit, add to, reorder, and/or modify any of the operations shown in FIG. 7. Each of the operations shown in FIG. 7 may be performed in any of the ways described herein.

At operation 702, image processing system 104 may apply a video stream to machine learning model 202. As described herein, the video stream is generated by imaging device 102 during a medical procedure performed with respect to a patient.

At operation 704, classification module 204 of image processing system 104 may classify an image frame included in the video stream based on an output of machine learning module 202.

If classification module 204 classifies the image frame as an in-body frame ("In-body frame", decision 706), privacy management module 602 may abstain from applying a privacy enhancing operation to the image frame (operation 708). Alternatively, if classification module 204 classifies the image frame as an ex-body frame ("Ex-body frame", decision 706), privacy management module 602 may apply a privacy enhancing operation to the image frame (operation 710).

As image frames classified as ex-body frames are typically not clinically relevant (i.e., if they are removed from the video stream or blurred in some way, the video stream is still useful to an observer), image processing system 104 may conserve processing resources by applying the privacy enhancing operation to all image frames classified as ex-body frames, even though some of the image frames classified as ex-body frames may not actually depict personally identifiable content. In alternative implementations, as described herein, image processing system 104 may further analyze image frames classified as ex-body frames to determine if they are clinically relevant and, in some example, abstain from applying the privacy enhancing operation to clinically relevant image frames classified as ex-body frames.

Privacy management module 602 may apply a privacy enhancing operation to an image frame in any suitable manner. For example, privacy management module 602 may apply the privacy enhancing operation to the image frame by removing the image frame from the video stream prior to transmitting the video stream for presentation outside a premises (e.g., an operating room, a hospital, a clinic, etc.) where the medical procedure is performed.

Figure 8:
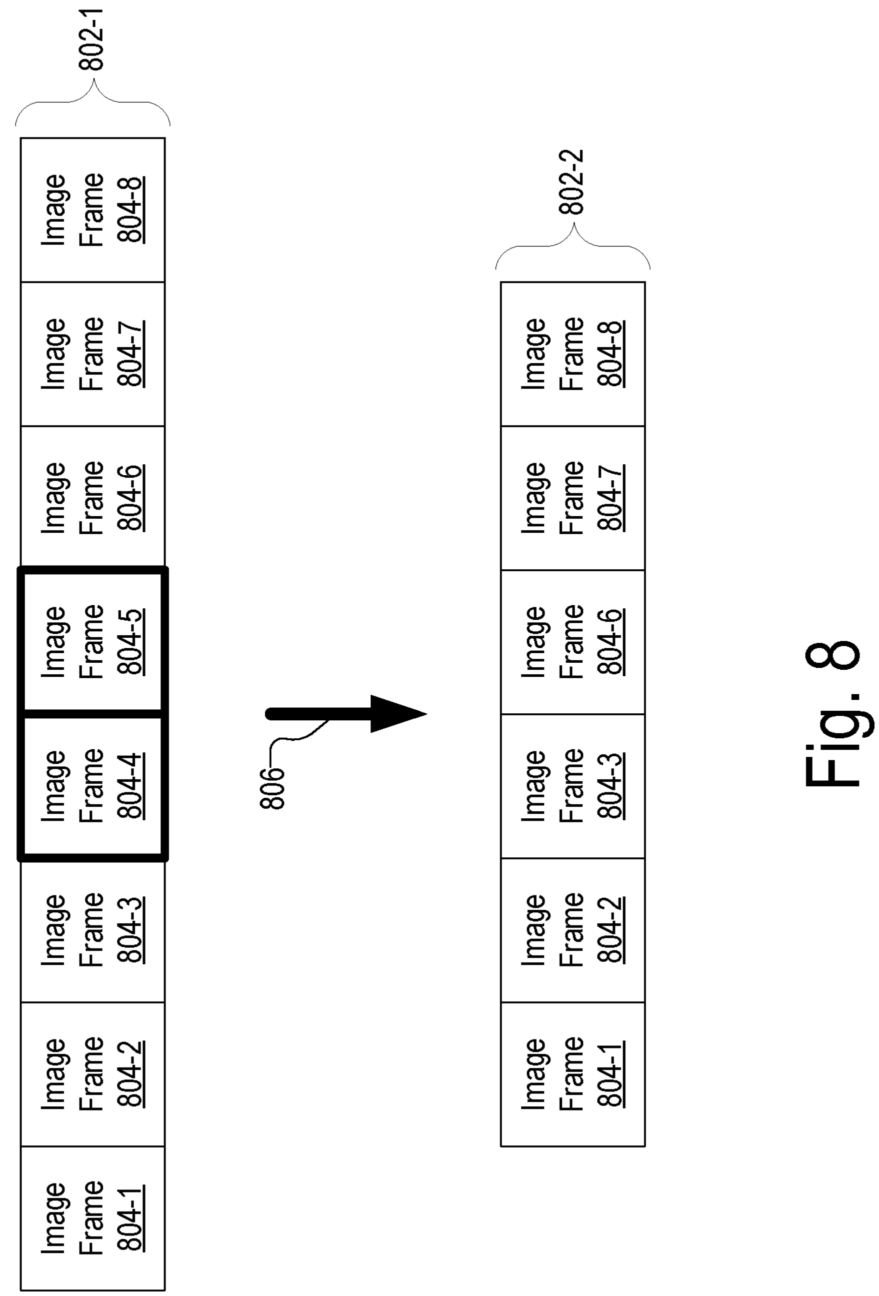
FIGS. 8-9 show exemplary privacy enhancing operations.

To illustrate, FIG. 8 shows an illustrative video stream 802-1 that includes a sequence of image frames 804 (e.g., image frames 804-1 through 804-8). While eight image frames 804 are shown to be included in video stream 802-1, it will be recognized that any suitable number (e.g., one or more) of image frames 804 may be included in video stream 802.

In this example, classification module 204 classifies image frames 804-4 and 804-5 as being ex-body frames (as indicated by the thick borders surrounding image frames 804-4 and 804-5) and image frames 804-1 through 804-3 and 804-6 through 804-8 as in-body frames.

Arrow 806 represents a privacy operation performed by privacy management module 602 with respect to image frames 804 included in video stream 802-1. As shown, the privacy operation includes removing image frames 804-4 and 804-5 from video stream 802-1 to generate a processed video stream 802-2 that does not include image frames 804-4 and 804-5. Processed video stream 802-2 may then be provided (e.g., in substantially real time during the medical procedure) by image processing system 104 for presentation (e.g., to an observer outside the operating room). By removing image frames 804-4 and 804-5, image processing system 104 may ensure that personally identifiable content potentially depicted in image frames 804-4 and 804-5 is not seen by unauthorized people.

Additionally or alternatively, privacy management module 602 may apply the privacy enhancing operation to the image frame by applying a blurring operation to the image frame. As used herein, a blurring operation refers to any operation that at least partially obscures content depicted by the image frame. As described herein, the blurring operation may be applied to the entire image frame or to a portion of the image frame.

Figure 9:
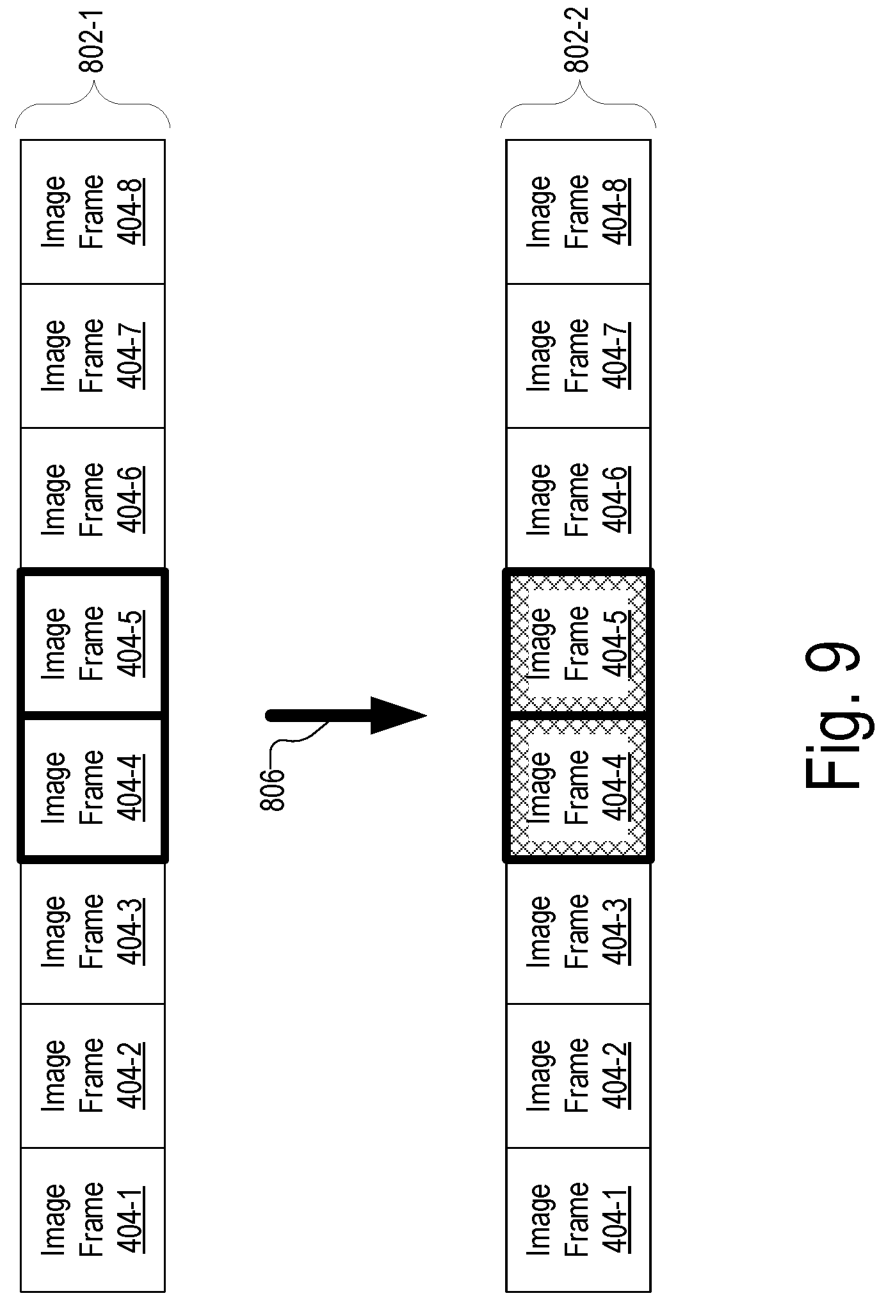

FIG. 9 illustrates a blurring operation that may be performed with respect to image frames classified as ex-body frames. FIG. 9 depicts the same video stream 802-1 described in connection with FIG. 8. As described in connection with FIG. 8, image frames 404-4 and 404-5 are classified as ex-body frames. Based on this, a blurring operation may be applied to image frames 404-4 and 404-5, as depicted by hatch marks on image frames 404-4 and 404-5 in processed video stream 802-2.

In some examples, image processing system 104 may determine a degree of blurring to be applied to an image frame based on a confidence interval of the output of machine learning model 202 and apply the blurring operation to the image frame in accordance with the degree of blurring.

For example, if the confidence interval of the output of machine learning model 202 is relatively high for a particular image frame (thereby indicating a relatively high likelihood that classification of the image frame is accurate), a relatively high degree of blurring may be applied to the image frame to ensure that personally identifiable content is appropriately obscured. In contrast, if the confidence interval of the output of machine learning model 202 is relatively low for a particular image frame, a relatively low degree of blurring may be applied to the image frame.

In some examples, a privacy enhancing operation (e.g., a blurring operation) may be applied to only a portion of an image frame (e.g., a portion that depicts personally identifiable content) instead of to the entire image frame. In this manner, an observer may still be able to see portions of the image frame that do not depict personally identifiable content.

For example, image processing system 104 may identify, within an image frame classified as an ex-body frame, a first pixel region that depicts personally identifiable content and a second pixel region that does not depict the personally identifiable content. Image processing system 104 (e.g., privacy management module 602) may then apply the privacy enhancing operation to the first pixel region and abstain from applying the privacy enhancing operation to the second pixel region.

Figure 10:
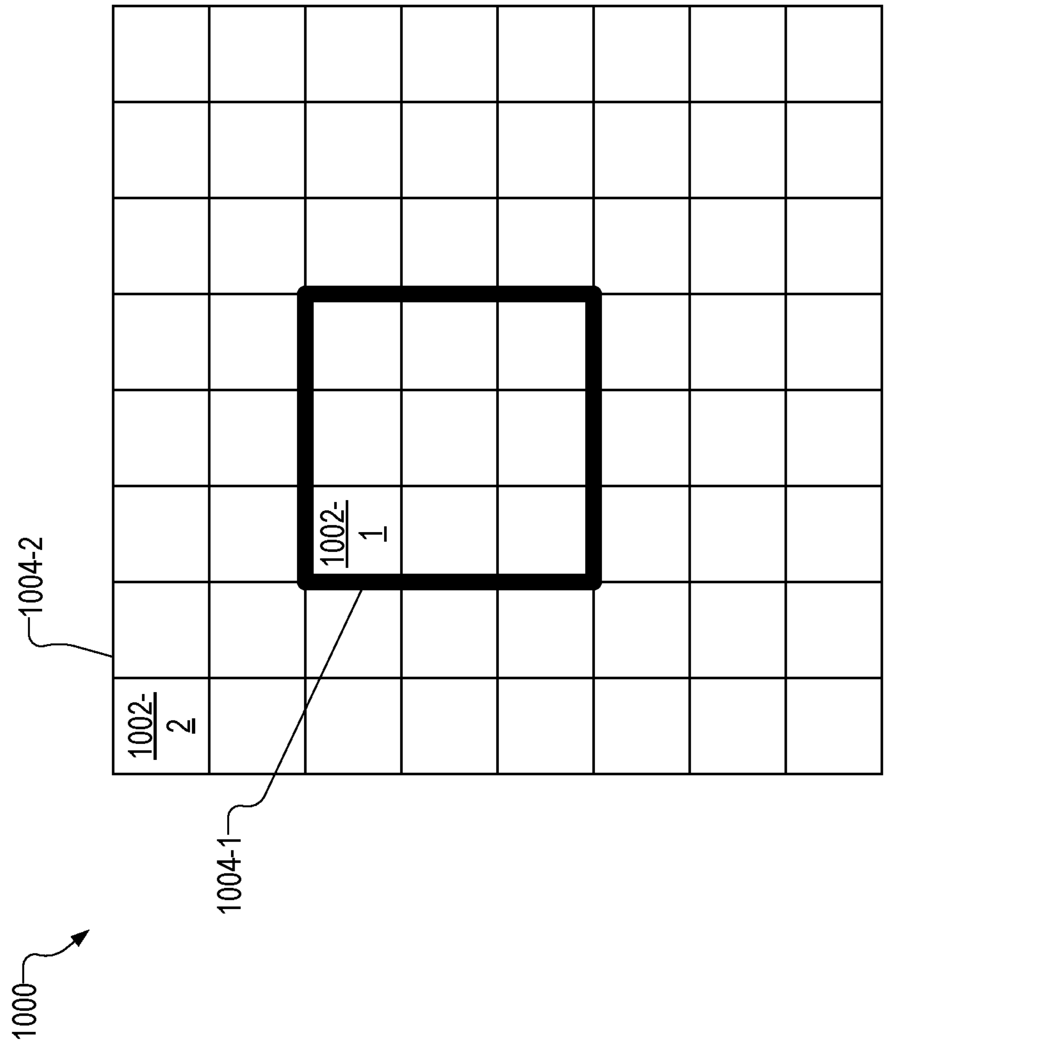
FIG. 10 shows an image frame.

To illustrate, FIG. 10 shows an image frame 1000 that includes a plurality of pixels (e.g., pixel 1002-1 and pixel 1002-2). In this example, pixel region 1004-1, which includes pixel 1002-1 and various other pixels, depicts personally identifiable content. However, pixel region 1004-2, which includes pixel 1002-2 and all other pixels not shown to be in pixel region 1004-1, does not depict personally identifiable content. Image processing system 104 may, in some examples, identify pixel region 1004-1 and accordingly apply the privacy enhancing operation to pixel region 1004-1 (and not to pixel region 1004-2).

Image processing system 104 may identify a pixel region that depicts personally identifiable content in any suitable manner. For example, image processing system 104 may apply the image frame to a machine learning model (e.g., a machine learning model trained to recognize personally identifiable content depicted in an image frame) and identify, based on an output of the machine learning model, a pixel region within the image frame that depicts the personally identifiable content. This machine learning model may be of any suitable type, such as any of those described herein. Additionally or alternatively, image processing system 104 may identify a pixel region that depicts personally identifiable content using any other suitable image processing technique.

As mentioned, image frames included in the video stream may include one or more visible light image frames (i.e., one or more images acquired using visible light illumination) and/or one or more alternate imaging modality frames (e.g., one or more images acquired using non-visible light). Illustrative alternate imaging modality frames include fluorescence images acquired using fluorescence excitation illumination having wavelengths in a near-infrared light region. To this end, imaging device 102 may be implemented by one or more imaging devices 102 configured to generate the visible light image frames and the alternate imaging modality frames.

Figure 11:
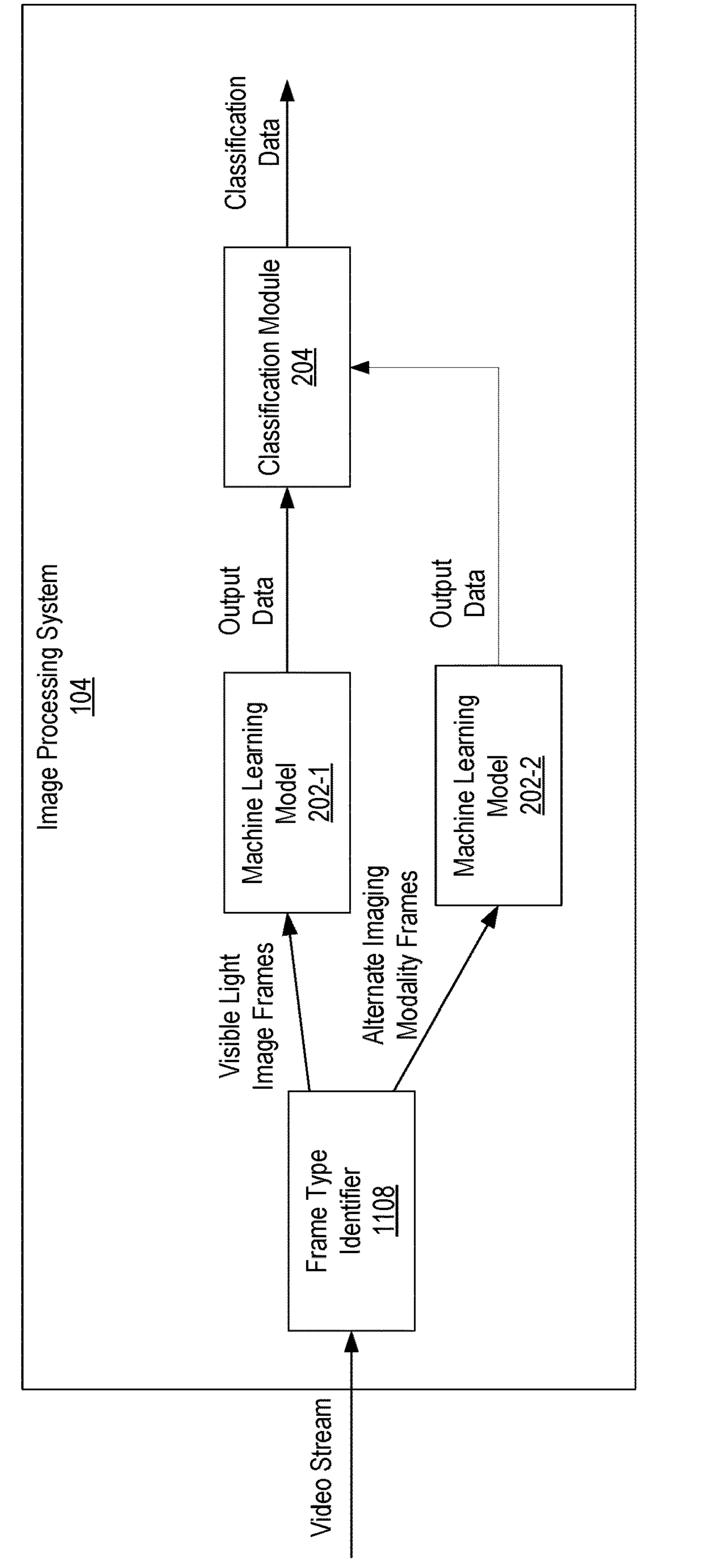
FIG. 11 shows an illustrative implementation of the image processing system of FIG. 1.

In some examples, machine learning model 202 may be implemented by separate machine learning models, each trained for a different imaging modality. For example, FIG. 11 shows an illustrative configuration 1100 of image processing system 104 in which separate machine learning models 202-1 and 202-2 are used to process visible light image frames and alternate imaging modality frames. As shown, a frame type identifier 1108 may be configured to identify visible light image frames included in the video stream and alternate imaging modality frames included in the video stream. Frame type identifier 1108 may identify these different types of image frames in any suitable manner.

As shown, frame type identifier 1108 may apply the visible light image frames to machine learning model 202-1 and the alternate imaging modality frames to machine learning model 202-2. Machine learning model 202-1 may be trained to output data that may be used by classification module 204 to classify visible light image frames as either ex-body or in-body frames. Likewise, machine learning model 202-2 may be trained to output data that may be used by classification module 204 to classify alternate imaging modality frames as either ex-body or in-body frames.

In some examples, frame type identifier 1108 may apply the visible light image frames to machine learning model 202-1 and the alternate imaging modality frames to machine learning model 202-2 by detecting a transition by imaging device 102 from operating in a visible light mode to operating in an alternate imaging mode. In response to the transition, frame type identifier 1108 may switch from applying the video stream to machine learning model 202-1 to applying the video stream to machine learning model 202-2.

While two machine learning models 202 are shown in FIG. 11, any number (e.g., more than two) of machine learning models may be used to analyze any number of different types of imaging modalities.

As mentioned, image processing system 104 may further analyze image frames classified as ex-body frames to determine if they are clinically relevant and, in some example, abstain from applying a privacy enhancing operation to such ex-body frames that are determined to be clinically relevant. For example, if an image frame classified as an ex-body frame depicts excised tissue located external to the patient, image processing system 104 may abstain from applying a privacy enhancing operation to at least a portion of the image frame even though the image frame is classified as being an ex-body frame.

To illustrate, FIG. 12 shows an illustrative method 1200 that may be performed by image processing system 104 and/or any implementation thereof. While FIG. 12 depicts illustrative operations according to one embodiment, other embodiments may omit, add to, reorder, and/or modify any of the operations shown in FIG. 12. Each of the operations shown in FIG. 12 may be performed in any of the ways described herein.

At operation 1202, image processing system 104 may apply a video stream to machine learning model 202. As described herein, the video stream is generated by imaging device 102 during a medical procedure performed with respect to a patient.

At operation 1204, classification module 204 of image processing system 104 may classify an image frame included in the video stream based on an output of machine learning module 202.

If classification module 204 classifies the image frame as an in-body frame ("In-body frame", decision 1206), privacy management module 602 may abstain from applying a privacy enhancing operation to the image frame (operation 1208).

Alternatively, if classification module 204 classifies the image frame as an ex-body frame ("Ex-body frame", decision 1206), privacy management module 602 may determine whether the image frame depicts excised tissue located external to the patient at decision 1210. This determination may be made in any suitable manner using any suitable image processing technique.

For example, privacy management module 602 may apply the image frame to a machine learning model trained to recognize excised tissue. This machine learning model may be of any suitable type, such as any of those described herein.

As another example, privacy management module 602 may determine that imaging device 102 is being used during a particular time interval to capture one or more images of the excised tissue. This determination may be made based on user input, kinematics data, an operational mode of imaging device 102 (e.g., a still image capture mode), and/or in any other suitable manner. If the image frame is associated with a timestamp included in the particular time interval, privacy management module 602 may determine that the image frame depicts excised tissue.

If the image frame is determined to not depict excised tissue ("No", decision 1210), privacy management module 602 may apply a privacy enhancing operation to the image frame at operation 1212.

Alternatively, if the image frame is determined to depict excised tissue ("Yes", decision 1210), privacy management module 602 may designate the image frame as a clinically relevant ex-body frame and accordingly abstain from applying the privacy enhancing operation to at least a portion of the image frame at operation 1214.

For example, privacy management module 602 may keep the image frame in the video stream even though the image frame is classified as being an ex-body frame.

While the examples described herein have been in the context of applying a video stream to machine learning model 202, it will be recognized that a single still image may also be applied to machine learning model 202 to classify the image as an ex-body frame or an as an in-body frame.

As another example, privacy management module 602 may abstain from applying the privacy enhancing operation to at least a portion of the image frame at operation 1214 by identifying, within the image frame, a first pixel region that depicts the excised tissue, identifying, within the image frame, a second pixel region that does not depict the excised tissue, applying a privacy enhancing operation (e.g., a blurring operation) to the second pixel region, and abstaining from applying the privacy enhancing operation to the first pixel region. This may be performed in a similar manner as described in connection with FIG. 10.

As has been described, imaging device 102 and/or image processing system 104 may be associated in certain examples with a computer-assisted medical system used to perform a medical procedure (e.g., a fluorescence-guided medical procedure) on a body. To illustrate, FIG. 13 shows an illustrative computer-assisted medical system 1300 that may be used to perform various types of medical procedures including surgical and/or non-surgical procedures.

Figure 13:
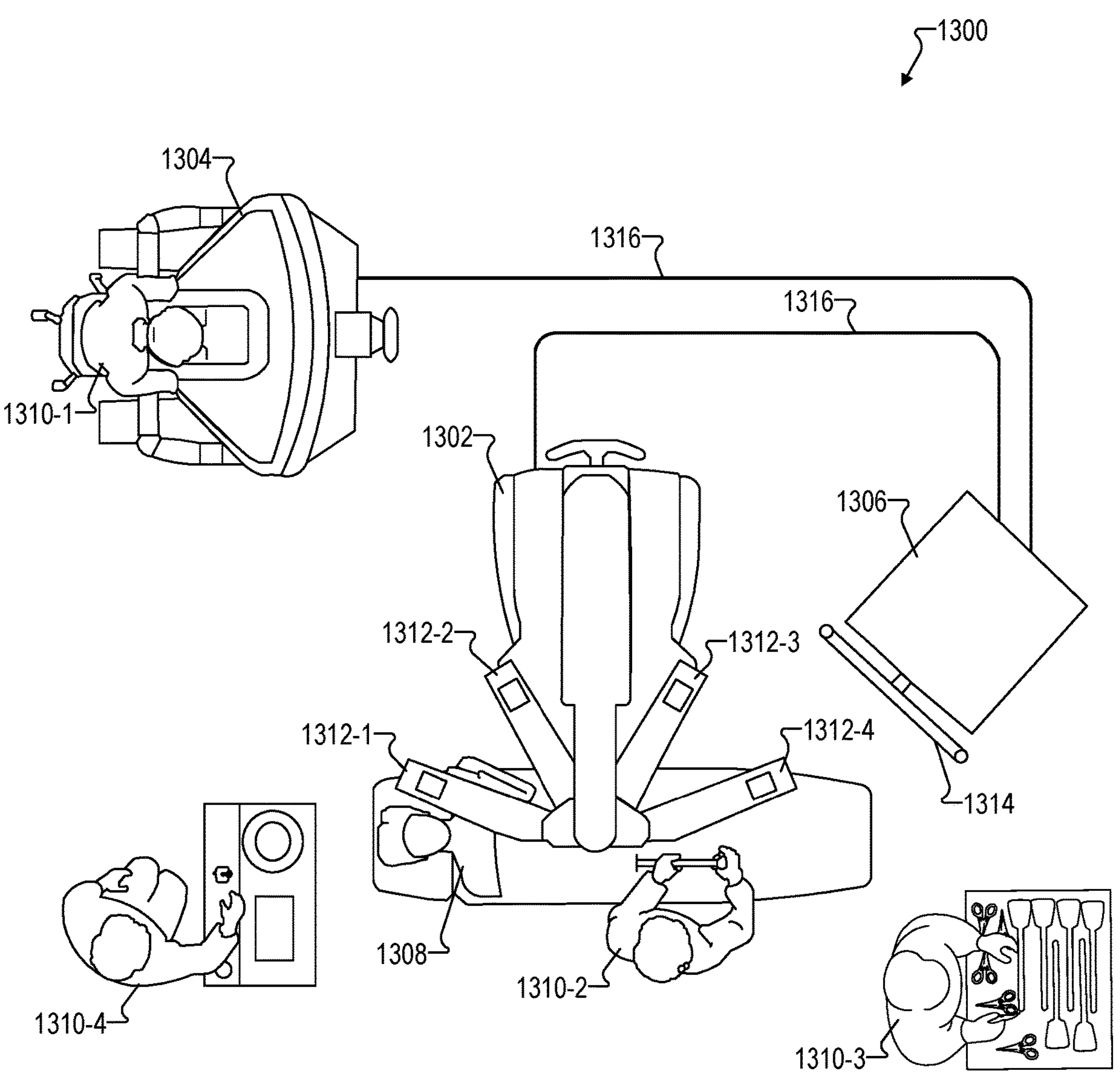
FIG. 13 shows an illustrative computer-assisted medical system according to principles described herein.

As shown, computer-assisted medical system 1300 may include a manipulator assembly 1302 (a manipulator cart is shown in FIG. 13), a user control apparatus 1304, and an auxiliary apparatus 1306, all of which are communicatively coupled to each other. Computer-assisted medical system 1300 may be utilized by a medical team to perform a computer-assisted medical procedure or other similar operation on a body of a patient 1308 or on any other body as may serve a particular implementation. As shown, the medical team may include a first user 1310-1 (such as a surgeon for a surgical procedure), a second user 1310-2 (such as a patient-side assistant), a third user 1310-3 (such as another assistant, a nurse, a trainee, etc.), and a fourth user 1310-4 (such as an anesthesiologist for a surgical procedure), all of whom may be collectively referred to as users 1310, and each of whom may control, interact with, or otherwise be a user of computer-assisted medical system 1300. More, fewer, or alternative users may be present during a medical procedure as may serve a particular implementation. For example, team composition for different medical procedures, or for non-medical procedures, may differ and include users with different roles.

While FIG. 13 illustrates an ongoing minimally invasive medical procedure such as a minimally invasive surgical procedure, it will be understood that computer-assisted medical system 1300 may similarly be used to perform open medical procedures or other types of operations. For example, operations such as exploratory imaging operations, mock medical procedures used for training purposes, and/or other operations may also be performed.

As shown in FIG. 13, manipulator assembly 1302 may include one or more manipulator arms 1312 (e.g., manipulator arms 1312-1 through 1312-4) to which one or more instruments may be coupled. The instruments may be used for a computer-assisted medical procedure on patient 1308 (e.g., in a surgical example, by being at least partially inserted into patient 1308 and manipulated within patient 1308). While manipulator assembly 1302 is depicted and described herein as including four manipulator arms 1312, it will be recognized that manipulator assembly 1302 may include a single manipulator arm 1312 or any other number of manipulator arms as may serve a particular implementation. While the example of FIG. 13 illustrates manipulator arms 1312 as being robotic manipulator arms, it will be understood that, in some examples, one or more instruments may be partially or entirely manually controlled, such as by being handheld and controlled manually by a person. For instance, these partially or entirely manually controlled instruments may be used in conjunction with, or as an alternative to, computer-assisted instrumentation that is coupled to manipulator arms 1312 shown in FIG. 13.

During the medical operation, user control apparatus 1304 may be configured to facilitate teleoperational control by user 1310-1 of manipulator arms 1312 and instruments attached to manipulator arms 1312. To this end, user control apparatus 1304 may provide user 1310-1 with imagery of an operational area associated with patient 1308 as captured by an imaging device. To facilitate control of instruments, user control apparatus 1304 may include a set of master controls. These master controls may be manipulated by user 1310-1 to control movement of the manipulator arms 1312 or any instruments coupled to manipulator arms 1312.

Auxiliary apparatus 1306 may include one or more computing devices configured to perform auxiliary functions in support of the medical procedure, such as providing insufflation, electrocautery energy, illumination or other energy for imaging devices, image processing, or coordinating components of computer-assisted medical system 1300. In some examples, auxiliary apparatus 1306 may be configured with a display monitor 1314 configured to display one or more user interfaces, or graphical or textual information in support of the medical procedure. In some instances, display monitor 1314 may be implemented by a touchscreen display and provide user input functionality. Augmented content provided by a region-based augmentation system may be similar, or differ from, content associated with display monitor 1314 or one or more display devices in the operation area (not shown).

Manipulator assembly 1302, user control apparatus 1304, and auxiliary apparatus 1306 may be communicatively coupled one to another in any suitable manner. For example, as shown in FIG. 13, manipulator assembly 1302, user control apparatus 1304, and auxiliary apparatus 1306 may be communicatively coupled by way of control lines 1316, which may represent any wired or wireless communication link as may serve a particular implementation. To this end, manipulator assembly 1302, user control apparatus 1304, and auxiliary apparatus 1306 may each include one or more wired or wireless communication interfaces, such as one or more local area network interfaces, Wi-Fi network interfaces, cellular interfaces, and so forth.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 14:
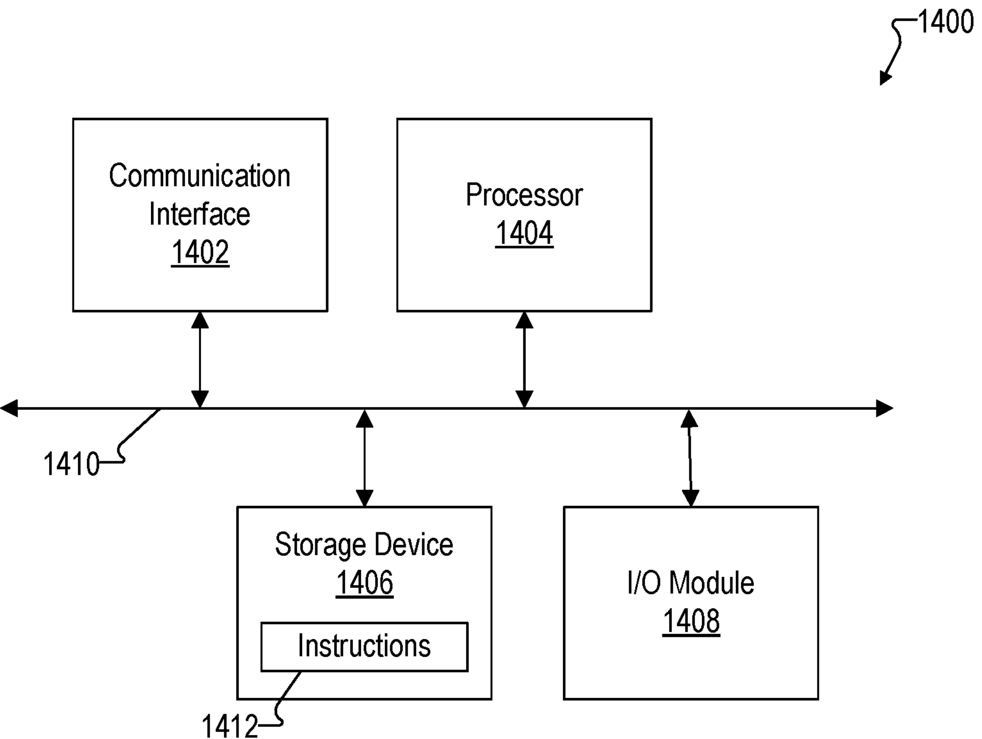
FIG. 14 shows an illustrative computing system according to principles described herein.

FIG. 14 shows an illustrative computing device 1400 that may be specifically configured to perform one or more of the processes described herein. Any of the systems, computing devices, and/or other components described herein may be implemented by computing device 1400.

As shown in FIG. 14, computing device 1400 may include a communication interface 1402, a processor 1404, a storage device 1406, and an input/output ("/O") module 1408 communicatively connected one to another via a communication infrastructure 1410. While an illustrative computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data and/or interpreting, executing, and/or directing execution of one or more of the instructions, processes, and/or operations described herein. Processor 1404 may perform operations by executing computer-executable instructions 1412 (e.g., an application, software, code, and/or other executable data instance) stored in storage device 1406.

Storage device 1406 may include one or more data storage media, devices, or configurations and may employ any type, form, and combination of data storage media and/or device. For example, storage device 1406 may include, but is not limited to, any combination of the non-volatile media and/or volatile media described herein. Electronic data, including data described herein, may be temporarily and/or permanently stored in storage device 1406. For example, data representative of computer-executable instructions 1412 configured to direct processor 1404 to perform any of the operations described herein may be stored within storage device 1406. In some examples, data may be arranged in one or more databases residing within storage device 1406.

I/O module 1408 may include one or more I/O modules configured to receive user input and provide user output. I/O module 1408 may include any hardware, firmware, software, or combination thereof supportive of input and output capabilities. For example, I/O module 1408 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:

a memory storing instructions; and a processor communicatively coupled to the memory and configured to execute the instructions to:

apply a video stream to a machine learning model, the video stream generated by an imaging device during a medical procedure performed with respect to a patient;

classify, based on an output of the machine learning model, an image frame included in the video stream as an ex-body frame that depicts content external to a body of the patient;

apply, based on the classifying the image frame as the ex-body frame, a privacy enhancing operation to the image frame, the applying the privacy enhancing operation to the image frame comprising:

determining a degree of blurring to be applied to the image frame based on a confidence interval of the output of the machine learning model, the confidence interval indicating a likelihood that the classifying of the image frame is correct and the degree of blurring representing a level of blurring to be applied to the image frame, and applying a blurring operation to the image frame in accordance with the degree of blurring;

determine, based on the output of the machine learning model, that an additional image frame included in the video stream depicts content internal to the body of the patient; and abstain, based on the determining that the additional image frame depicts content internal to the body of the patient, from applying the privacy enhancing operation to the additional image frame.

2. The system of claim 1, wherein the applying the privacy enhancing operation to the image frame further comprises removing the image frame from the video stream prior to transmitting the video stream for presentation outside a premises where the medical procedure is performed.

3. The system of claim 1, wherein the applying the privacy enhancing operation to the image frame further comprises:

identifying, within the image frame, a first pixel region that depicts personally identifiable content and a second pixel region that does not depict the personally identifiable content;

applying the privacy enhancing operation to the first pixel region; and abstaining from applying the privacy enhancing operation to the second pixel region.

4. The system of claim 3, wherein the identifying the first pixel region that depicts the personally identifiable content comprises:

applying the image frame to an additional machine learning model; and identifying, based on an output of the additional machine learning model, the first pixel region that depicts the personally identifiable content.

5. The system of claim 1, wherein:

the imaging device is attached to a manipulator arm of a computer-assisted medical system while the video stream is generated by the imaging device;

the processor is further configured to execute the instructions to access kinematics data associated with the computer-assisted medical system; and the classifying is further based on the kinematics data.

6. The system of claim 1, wherein:

the processor is further configured to execute the instructions to determine a phase of the medical procedure; and the classifying is further based on the phase of the medical procedure.

7. The system of claim 1, wherein the processor is further configured to execute the instructions to:

identify a time interval during the medical procedure during which the imaging device moves less than a threshold amount; and abstain from applying, to the machine learning model, a video segment included in the video stream and that corresponds to the time interval.

8. The system of claim 1, wherein:

the video stream comprises one or more visible light image frames and one or more alternate imaging modality frames; and the applying the video stream to the machine learning model comprises:

applying the one or more visible light image frames to a first machine learning model, and applying the one or more alternate imaging modality frames to a second machine learning model.

9. The system of claim 8, wherein the applying the one or more visible light image frames to the first machine learning model and the applying the one or more alternate imaging modality frames to the second machine learning model comprises:

detecting a transition by the imaging device from operating in a visible light mode to operating in an alternate imaging mode; and switching, in response to the transition, from applying the video stream to the first machine learning model to applying the video stream to the second machine learning model.

10. The system of claim 1, wherein the applying the video stream to the machine learning model, the classifying, and the applying the privacy enhancing operation are performed while the medical procedure is being performed.

11. A system comprising:

a memory storing instructions; and a processor communicatively coupled to the memory and configured to execute the instructions to:

apply a video stream to a machine learning model, the video stream generated by an imaging device during a medical procedure performed with respect to a patient;

classify, based on an output of the machine learning model, a first plurality of image frames included in the video stream as in-body frames that depict content internal to a body of the patient;

apply, based on the classifying the first plurality of image frames as in-body frames, a privacy enhancing operation to a second plurality of image frames included in the video stream, the second plurality of image frames not included in the first plurality of image frames, the applying the privacy enhancing operation to the second plurality of image frames comprising:

determining a degree of blurring to be applied to the second plurality of image frames based on a confidence interval of the output of the machine learning model, the confidence interval indicating a likelihood that the classifying of the image frame is correct and the degree of blurring representing a level of blurring to be applied to the image frame, and applying a blurring operation to the second plurality of image frames in accordance with the degree of blurring; and abstain from applying the privacy enhancing operation to the first plurality of image frames.

12. The system of claim 11, wherein the applying the privacy enhancing operation comprises removing the second plurality of image frames from the video stream prior to transmitting the video stream for presentation outside a premises where the medical procedure is performed.

13. The system of claim 11, wherein:

the imaging device is attached to a manipulator arm of a computer-assisted medical system while the video stream is generated by the imaging device;

the processor is further configured to execute the instructions to access kinematics data associated with the computer-assisted medical system; and the classifying is further based on the kinematics data.

14. The system of claim 11, wherein:

the processor is further configured to execute the instructions to determine a phase of the medical procedure; and the classifying is further based on the phase of the medical procedure.

15. A method comprising:

applying, by an image processing system, a video stream to a machine learning model, the video stream generated by an imaging device during a medical procedure performed with respect to a patient;

classifying, by the image processing system based on an output of the machine learning model, an image frame included in the video stream as an ex-body frame that depicts content external to a body of the patient;

applying, by the image processing system based on the classifying the image frame as the ex-body frame, a privacy enhancing operation to the image frame, the applying the privacy enhancing operation to the image frame comprising:

determining a degree of blurring to be applied to the image frame based on a confidence interval of the output of the machine learning model, the confidence interval indicating a likelihood that the classifying of the image frame is correct and the degree of blurring representing a level of blurring to be applied to the image frame, and applying a blurring operation to the image frame in accordance with the degree of blurring;

determining, by the image processing system based on the output of the machine learning model, that an additional image frame included in the video stream depicts content internal to the body of the patient; and abstaining, by the image processing system based on the determining that the additional image frame depicts content internal to the body of the patient, from applying the privacy enhancing operation to the additional image frame.

16. The method of claim 15, wherein the applying the privacy enhancing operation to the image frame further comprises removing the image frame from the video stream prior to transmitting the video stream for presentation outside a premises where the medical procedure is performed.

17. The method of claim 15, wherein the applying the privacy enhancing operation to the image frame further comprises:

identifying, within the image frame, a first pixel region that depicts personally identifiable content and a second pixel region that does not depict the personally identifiable content;

applying the privacy enhancing operation to the first pixel region; and abstaining from applying the privacy enhancing operation to the second pixel region.

18. The method of claim 17, wherein the identifying the first pixel region that depicts the personally identifiable content comprises:

applying the image frame to an additional machine learning model; and identifying, based on an output of the additional machine learning model, the first pixel region that depicts the personally identifiable content.

* * * * *